United States Patent Office 3,383,183
Patented May 14, 1968

3,383,183
PROCESSING OF METAL FLUORIDES INCLUDING URANIUM HEXAFLUORIDE WITH ANHYDROUS HYDROGEN FLUORIDE
Albert Edgar Grant, Kirkham, England, assignor to United Kingdom Atomic Energy Authority, London, England
No Drawing. Filed Sept. 29, 1965, Ser. No. 491,398
Claims priority, application Great Britain, Oct. 5, 1964, 40,594/64
5 Claims. (Cl. 23—326)

ABSTRACT OF THE DISCLOSURE

A metal fluoride is separated from a mixture of metal fluorides including $UF_6$ by treating the mixture with liquid anhydrous HF to dissolve at least some of the $UF_6$ and at least some of one or more other metal fluorides soluble in HF, and subsequently treating the solution to recover metal fluoride from the solution. $UF_6$, for example, can be separated from mixtures of various metal fluorides.

---

This invention relates to the processing of metal fluorides.

It has been suggested that uranium should be won from uraniferous ores by direct fluorination of the ore concentrates to produce uranium hexafluoride and other volatile fluorides, the uranium hexafluoride being purified by distillation under pressure. (Uranium Production Technology by Harrington and Ruele p. 499. Published by Van Nostrand 1955). It has also been suggested that irradiated nuclear fuel—metal, carbide or oxide—should be reacted with anyhdrous hydrogen fluoride, fluorine or a combination of both at temperatures of the order of 500–600° C. so that volatile fluorides including uranium hexafluoride and plutonium hexafluoride are distilled off, the volatile fluorides being subsequently separated by selective absorption on beds of sodium fluoride with temperature cycling or by a combination of solvent extraction and ion exchange techniques. (Reactor Fuel Processing, January 1963 p. 22).

According to the present invention a process for separating a mixture of metal fluorides including uranium hexafluoride comprises the steps of bringing the mixture into contact with liquid anhydrous hydrogen fluoride to dissolve at least some of the uranium hexafluoride and treating the hydrogen fluoride solution so formed to recover fluoride therefrom.

The fluoride may be recovered by distillation or crystallisation, for example, or as oxyfluoride by the addition of water to the hydrogen fluoride solution.

The method is considered particularly suitable for separating mixtures of fluoride which have been volatilised, the fluorides being passed as vapours into the liquid anhydrous hydrogen fluoride.

As an example of one way of carrying the invention into effect a mixture of fluoride vapours obtained by fluorination of irradiated uranium-containing nuclear fuel is passed into liquid anhydrous hydrogen fluoride (AHF) maintained just below its boilng point. Uranium hexafluoride, plutonium hexafluoride and other more soluble fluorides will go into solution in the AHF. Less soluble fluorides such as those of cerium and zirconium form a precipitate which is separated from the liquid hydrogen fluoride solution by decantation or filtration. The stage at which precipitation occurs will depend on the composition of the fluoride vapours. The hydrogen fluoride solution which contains up to 15% w./w. uranium hexafluoride in AHF, is distilled to give rise to AHF vapour more concentrated in uranium hexafluoride. On cooling this vapour uranium hexafluoride crystals separate out. These crystals may be further purified by dissolving them in AHF and repeating the distillation and crystallisation cycle. To isolate other, less soluble fluorides evaporation of the hydrogen fluoride solution is carried out in stages with interstage cooling of the boiler residues to precipitate individual fluorides which may be subsequently purified by repeating the dissolution, evaporation and inter-stage cooling. The boiler residues arising in the distillation of the hydrogen fluoride solution and the mother liquors remaining after separation of uranium hexaflouride crystals from the dissillate may be used for the solution of further fluoride mixtures. There is thus no undesirable gaseous or liquid effuent from the process.

If the fluorides to be separated are preferred in the form of oxyfluoride or have similar solubilities they may be separated by adding the theoretical amount of water or water in the form of dilute hydrogen fluoride to the AHF solution.

It is an advantage of the process of the invention that it uses only one chemical—AHF—which can be recycled indefinitely apart from mechanical losses. Also the uranium, plutonium and fission products are produced in a form readily converted to stable oxides, suitable for storage or further easy processing.

I claim:
1. A process for separating a mixture of metal fluorides including uranium hexafluoride, said process comprising the steps of bringing a mixture of metal fluorides into contact with liquid anhydrous hydrogen fluoride to dissolve at least some of the uranium hexafluoride and at least one other metal fluoride and treating the hydrogen fluoride solution so formed to recover metal fluoride therefrom.
2. A process as claimed in claim 1 wherein the mixture of fluorides is volatilised and passed as vapour into the liquid anhydrous fluoride.
3. A process as claimed in claim 1 wherein metal fluoride is recovered from the hydrogen fluoride solution by distillation.
4. A process as claimed in claim 1 wherein metal fluoride is recovered from the hydrogen fluoride solution by crystallisation.
5. A process as claimed in claim 1 wherein metal fluoride is recovered as oxyfluoride by the addition of water to the hydrogen fluoride solution.

References Cited

UNITED STATES PATENTS 2,808,312  10/1957  Rudge et al. _____ 23—326

OTHER REFERENCES

Stroller et al., Reactor Handbook 2nd edition, vol. 11, "Fuel Reprocessing," p. 279, Interscience Publishers, Inc., N.Y. 1961.

L. DEWAYNE RUTLEDGE, *Primary Examiner.*

CARL D. QUARFORTH, *Examiner.*

S. TRAUB, R. L. GRUDZIECKI, *Assistant Examiners.*